UNITED STATES PATENT OFFICE 2,614,972

PURIFICATION OF SECONDARY BUTYL ACETATE

William Selby Harney, Jr., Elizabeth, N. J., assignor to Standard Oil Development Company, a corporation of Delaware No Drawing. Application October 28, 1948, Serial No. 57,131

2 Claims. (Cl. 202—51)

This invention relates to a method for the purification of secondary butyl acetate, and particularly to the removal of secondary butyl alcohol therefrom. More specifically, the invention is concerned with the production of a refined grade of sec-butyl acetate from the crude ester by distillation of the crude ester under super-atmospheric pressure.

Crude aliphatic esters prepared by commercial processes, for example, the esterification process of U. S. Patents 1,770,779 and 2,147,341, contain substantial quantities of water and alcohol among other impurities. Crude sec-butyl acetate prepared by the esterification of sec-butyl alcohol with acetic acid is recovered by distillation from the esterification mixture. The crude acetate contains in the neighborhood of 50 to 85 weight per cent of ester; 5 to 35 weight per cent sec-butyl alcohol, and 2 to 10 weight per cent of water. The crude ester is further refined by fractional distillation to remove practically all the water which generally runs in the neighborhood of 4 to 6 weight per cent, and sufficient amounts of sec-butyl alcohol in order to concentrate the acetate content to about 86 to 88 weight per cent. Where the market demands an ester of higher purity, more sec-butyl alcohol must be removed.

The sec-butyl alcohol-sec-butyl acetate system is such that separation by distillation at atmospheric conditions requires extremely efficient operation. The relative volatility of the components is fairly low and under practical operating conditions, efficient separation is very difficult. Extremely fine distillation control is necessary to accomplish the desired separation to make a product of high purity. Such control demands an extremely large tower with a large number of plates and a high reflux ratio which are outside the bounds of practical operating conditions.

In removing sec-butyl alcohol from the acetate to build up the strength of the acetate under ordinary distillation conditions, much acetate is also removed with the alcohol. This produces a costly recycle stream and increases steam costs. Assume, for example, that a sec-butyl acetate batch finishing column is set up to process a feed containing 30 weight per cent sec-butyl alcohol and 70 weight per cent sec-butyl acetate, so that a product containing 14 weight per cent sec-butyl alcohol and 86 weight per cent sec-butyl acetate will be produced. Such a unit would normally produce an initial cut containing about 80 weight per cent sec-butyl alcohol, and this stream, which must eventually be processed or recycled to recover the 20 weight per cent sec-butyl acetate present, constitutes 24 weight per cent of the feed to the column. In other words, there is a recycle stream of 24 lbs. for every 100 lbs. of feed to the unit.

According to the terms of this invention, the efficient removal of sec-butyl alcohol from sec-butyl acetate is accomplished by carrying out the distillation of the crude acetate under super-atmospheric pressures particularly pressures up to 75 p. s. i. g. and preferably pressures of 10 to 50 p. s. i. g. Pressures higher than 75 p. s. i. g. may be employed but the increase in relatively volatility is not appreciable at these higher pressures.

It has been found that if the above mentioned distillation unit were operated at an elevated pressure, several combinations of advantages can be obtained. The ester content of the overhead is extremely reduced due to the increase in relative volatility between the components of the mixture being distilled. The recycle stream is reduced or eliminated. Reflux ratio can be reduced thus saving steam costs, and the ester content of the product can be increased.

For example, at 10 lbs. p. s. i. g. pressure the reflux ratio can be cut in half and the overhead stream produced by the column will increase in alcohol content from the conventional 80 weight per cent up to 99 weight per cent. Thus, to obtain the same product quality, rates may be doubled and the stream reduced from 24 weight per cent to 19 weight per cent. There would be no need to recycle a stream containing only 1 weight per cent sec-butyl acetate for the recovery of the acetate therefrom. In other words, the same size overhead of 99 weight per cent sec-butyl alcohol could be taken (namely 24 weight per cent), and a product containing 92 weight per cent sec-butyl acetate is produced compared to the conventional 86 weight per cent sec-butyl acetate product, and this ester could be produced in less time and at lower steam costs than at present.

Since at elevated pressures almost pure sec-butyl alcohol can be distilled away from the sec-butyl alcohol sec-butyl acetate feed mixture, a product approaching 100 weight per cent sec-butyl acetate can be produced without creating any recycle stream. Operation of the distillation unit at 20 lbs. p. s. i. g. produces 99 weight per cent sec-butyl acetate at the same rate which produces 86 weight per cent sec-butyl acetate at atmospheric pressure without appreciable operating costs increase.

Data have been obtained which demonstrate the improved separation of sec-butyl alcohol from sec-butyl acetate which can be accomplished at elevated pressures due to the increase in relative volatility (alpha) with pressure. These data are shown in the following table.

TABLE I

*Effect of pressure on the relative volatility (alpha) in the system secondary butyl alcohol sec. butyl acetate*

| Mol Percent SBOH in Liquid Phase | Values of Alpha [1] | | | | |
|---|---|---|---|---|---|
| | Atm. Pressure | 10# p.s.i.g. | 20# p.s.i.g. | 30# p.s.i.g. | 40# p.s.i.g. |
| 10 | 2.1 | 2.5 | 2.8 | 3.0 | 3.2 |
| 30 | 1.6 | 2.0 | 2.3 | 2.4 | 2.5 |
| 50 | 1.4 | 1.8 | 2.0 | 2.1 | 2.1 |
| 70 | 1.3 | 1.6 | 1.7 | 1.8 | 1.9 |

[1] $\text{Alpha} = \frac{\text{Mol percent SBOH in vapor}}{\text{Mol percent SBAc in vapor}} \times \frac{\text{Mol percent SBOH in liquid}}{\text{Mol percent SBAc in liquid}}$ It has also been found that distillation at sub-atmospheric pressure is detrimental to the separation in that azeotropism occurs between the alcohol and the acetate at reduced pressures. The effect of reduced pressure on the system is shown in the following table.

TABLE II

*Effect of sub-atmospheric pressure on the composition of SBOH-SBAc azeotrope*

| Absolute Pressure, mm. Hg. | Wt. percent SBAc in the Const. Boiling Mixture | Boiling Point, °C of Const. Boiling Mixture |
|---|---|---|
| 20 | 59 | 23 |
| 330 | 30 | 77 |
| 610 | 8 | 95 |
| 710 | 5 | 98 |

Although the literature carries a report of the existence of a binary azeotrope of sec-butyl alcohol sec-butyl acetate at atmospheric pressure containing large amounts of sec-butyl acetate, the present inventor has been unable to confirm the same since no constant boiling mixture was obtained by distillation at atmospheric pressure.

From the values of alpha in Table I, it can be seen that the increase in relative volatility is greatest at the lower mol per cent concentrations of sec-butyl alcohol in the liquid phase. It is such concentrations which are found to exist in the crude sec-butyl acetate product as commercially produced.

The following description of the use of this process to produce a high purity SBAc product illustrates the advantage of operating the finishing still at an elevated pressure of 10 lbs. p.s.i.g. pressure.

10,000 pounds of crude ester containing 70 weight per cent SBAc, 5 weight per cent H₂O and 25 weight per cent SBOH is charged to a batch still. In the initial phase of the purification operation, a ternary azeotrope will be formed which separates into two layers. Approximately 550 pounds of a separated lower layer will be removed which is essentially water with small concentrations of SBOH and traces of SBAc present.

Following this "dehydration" step which takes place under conditions of total reflux, an initial fraction is removed at a reflux ratio of about 3:1 which contains traces of water, 1% SBAc and 99% SBOH. After a fraction of 2500 pounds of this material has been removed, the charge remaining in the still-pot is essentially SBAc with some traces of high boiling impurities. A product fraction is then taken overhead of 99%+ purity in the size of 6500 pounds which represents a recovery of better than 93% of the SBAc originally present in the crude acetate charge.

The first fraction of 99% strength SBOH can be used again in future esterification operations without requirement of any previous processing.

Having set forth the invention in a manner such that it may be practiced by one skilled in the art, what is claimed is:

1. A process for purifying sec-butyl acetate contained in a mixture with sec-butyl alcohol and water, said mixture containing 50 to 85 weight percent acetate, 5 to 35 weight percent alcohol and 2 to 10 weight percent water which comprises distilling the mixture in a distillation zone under a super-atmospheric pressure of 10 to 75 p.s.i.g., removing and condensing a two-phase distillate consisting of an upper organic layer comprising substantially sec-butyl acetate and sec-butyl alcohol, and a lower aqueous layer comprising substantially water, removing the lower aqueous layer from the system, refluxing the upper organic layer to the distillation zone, continuing the distillation to remove from the distillation zone a second distillate comprising substantially sec-butyl alcohol, and a third distillate consisting of sec-butyl acetate substantially free of water and sec-butyl alcohol.

2. A process according to claim 1 in which the mixture contains approximately 70 weight percent sec-butyl acetate, 5 weight percent water and 25 weight percent sec-butyl alcohol.

WILLIAM SELBY HARNEY, JR.

REFERENCES CITED

The following references are of record in the file of this patent:

UNITED STATES PATENTS

| Number | Name | Date |
|---|---|---|
| 1,676,700 | Lewis | July 10, 1928 |
| 2,049,486 | Babcock | Aug. 4, 1936 |
| 2,311,180 | Bogart et al. | Feb. 16, 1943 |
| 2,324,255 | Britton et al. | July 13, 1943 |
| 2,370,948 | Gadwa | Mar. 6, 1945 |
| 2,381,876 | Carlson | Aug. 14, 1945 |
| 2,409,773 | Luten et al. | Oct. 22, 1946 |
| 2,445,738 | Willert | July 20, 1948 |
| 2,485,329 | Steele et al. | Oct. 18, 1949 |

OTHER REFERENCES

Young: Distillation Principles and Processes, Published 1922, by Macmillan and Company, Ltd., St. Martins St., London, pages 59, 60, and 61.

Mair et al: Bureau of Standards Journal Research, vol. 27, pages 58 and 59, July 1947.